(12) United States Patent
Graham et al.

(10) Patent No.: US 6,233,641 B1
(45) Date of Patent: May 15, 2001

(54) APPARATUS AND METHOD OF PCI ROUTING IN A BRIDGE CONFIGURATION

(75) Inventors: Charles Scott Graham, Rochester; Shawn Michael Lambeth, Pine Island; Daniel Frank Moertl; Paul Edward Movall, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/093,441

(22) Filed: Jun. 8, 1998

(51) Int. Cl.[7] ........................................ G06F 13/38
(52) U.S. Cl. .................. 710/131; 710/129; 710/128; 710/31
(58) Field of Search ............................ 710/128–132, 710/31, 37, 38, 42, 20, 22, 126, 127, 107, 110, 36, 27

(56) References Cited

U.S. PATENT DOCUMENTS

| | | | |
|---|---|---|---|
| 5,761,462 | * 6/1998 | Neal et al. | 710/129 |
| 5,799,207 | * 8/1998 | Wang et al. | 710/38 |
| 5,835,738 | * 11/1998 | Blackledge, Jr. et al. | 710/127 |
| 5,838,932 | * 11/1998 | Alzien | 710/128 |
| 5,838,935 | * 11/1998 | Davis et al. | 710/129 |
| 5,842,041 | * 11/1998 | McKee et al. | 710/23 |
| 5,848,249 | * 12/1998 | Garbus et al. | 710/128 |
| 5,859,988 | * 1/1999 | Ajanovic et al. | 710/129 |
| 5,878,237 | * 3/1999 | Olarig | 710/128 |
| 5,935,233 | * 8/1999 | Jeddeloh | 710/129 |
| 5,982,928 | * 4/1999 | Wallach et al. | 710/103 |
| 6,009,492 | * 12/1999 | Matsuoka | 710/129 |
| 6,081,863 | * 6/2000 | Kelley et al. | 710/129 |

* cited by examiner

Primary Examiner—Robert Beausoleil
Assistant Examiner—Raymond N Phan
(74) Attorney, Agent, or Firm—Wood, Herron & Evans, L.L.P.

(57) ABSTRACT

A primary PCI bus and multiple secondary PCI busses of a PCI expansion card interface, are interconnected by a routing circuit. The routing circuit functions as a switched bridge between the primary PCI bus and each of the secondary PCI busses, respectively, by associating each secondary PCI bus with an address range, and forwarding a command received from the primary PCI bus to a secondary PCI bus mapped to an address range including the address of the command. Furthermore, the routing circuit forwards commands intended for the primary PCI bus from the secondary PCI busses. In addition, the routing circuit directly routes commands between the secondary PCI busses, when commands received from one secondary PCI bus are intended for another PCI bus, without use of the primary bus. As a result, traffic and latency on the primary PCI bus is reduced and efficiency is increased.

25 Claims, 9 Drawing Sheets

ROUTING TABLE SLOT ENTRIES (NON DAC)

| | |
|---|---|
| 80 — I/O CYCLE LIMIT (BITS 31:16)<br>82 — I/O CYCLE BASE (BITS 31:16)<br>84 — I/O ADDRESS Δ (BITS 31:16)<br>86 — SLOT NUMBER | 7 MORE ENTRIES |
| 88 — MEMORY CYCLE LIMIT (BITS 31:16)<br>90 — MEMORY CYCLE BASE (BITS 31:16)<br>92 — MEMORY ADDRESS Δ (BITS 31:16)<br>94 — SLOT NUMBER<br>96 — READ PREFETCH SIZE<br>98 — READ-LINE PREFETCH SIZE<br>100 — READ-MULTIPLE PREFETCH SIZE<br>102 — WRITE SIZE | 15 MORE ENTRIES |

FIG. 4B

ROUTING TABLE SLOT ENTRIES (DAC)

| | | |
|---|---|---|
| 80 — I/O CYCLE LIMIT (BITS 31:16)<br>82 — I/O CYCLE BASE (BITS 31:16)<br>84 — I/O ADDRESS Δ (BITS 31:16)<br>86 — SLOT NUMBER | 7 MORE ENTRIES | |
| 88 — DAC MEMORY CYCLE LIMIT (BITS 31:16)<br>90 — DAC MEMORY CYCLE BASE (BITS 31:16)<br>92 — DAC MEMORY ADDRESS Δ (BITS 31:16)<br>94 — SLOT NUMBER<br>96 — READ PREFETCH SIZE<br>98 — READ-LINE PREFETCH SIZE<br>100 — READ-MULTIPLE PREFETCH SIZE<br>102 — WRITE SIZE | DAC MEMORY<br>UPPER LIMIT (BITS 63:32)<br><br>DAC MEMORY<br>LOWER LIMIT<br>(BITS 63:32) | 7 MORE<br>ENTRIES |

FIG. 4C

APPARATUS AND METHOD OF PCI ROUTING IN A BRIDGE CONFIGURATION

FIELD OF THE INVENTION

The invention is generally related to routing of bus commands between computer systems and expansion slots and cards.

BACKGROUND OF THE INVENTION

Computer systems typically include expansion slots which permit the enhancement of the functionality of the computer system by the inclusion of additional circuitry. These expansion slots are typically connected via an expansion bus to the processor complex, i.e., the processor and its associated circuitry. For example, an input/output adapter (IOA) can be added to a computer system to allow external receipt and transmission of data, e.g., from a computer network.

Several standards have evolved for expansion slots and expansion cards. Two well known standards are the ISA standard and Microchannel standard, both of which define particular arrangements of the contacts in the expansion slots and the edge of the expansion cards, as well as defining protocols for communication between a compatible expansion card and the computer system.

A more recent standard is the PCI standard, which is intended for use in many computing environments in place of or in addition to the older ISA and Microchannel standards. The PCI architecture includes, in addition to other features supported by earlier standards, a definition for a PCI bridge. A PCI bridge connects between a "primary" PCI expansion bus at the side of the bridge closest to the processor, and a "secondary" bus on the other side of the bridge; the secondary bus may be a PCI, ISA, Microchannel, or other type of expansion bus. A PCI bridge might be used where there are not enough slots in a computer system to connect all desired expansion cards, and an additional slot or slots is desired; the additional slots can be provided on the secondary bus. A PCI bridge may also be used to interface the PCI bus on a computer system to older ISA or Microchannel expansion cards connected to a secondary ISA or Microchannel bus, which is bridged to the primary PCI bus.

Additionally, a PCI bridge may be used to provide a "hot swap" capability: specifically, the presence of the bridge permits power to be applied to and removed from the secondary bus independently from the primary bus. Accordingly, the expansion cards on the secondary bus can be replaced while the computer system remains on, by removing power from the secondary bus, replacing the card on the secondary bus, and then reapplying power to the secondary bus. In computing systems which support hot swapping of some or all of the expansion cards, each expansion card may be on a separate secondary bus bridged to the primary PCI bus, to permit the expansion cards to be individually hot-swapped without power-down of any other expansion cards.

The PCI standard specifies that a PCI bridge provide address mapping registers which can be configured from the primary bus. The values in the address mapping registers define an address range within the entire address space of the primary bus. When a memory or input/output (I/O) command is delivered to the primary bus by the processor or other circuitry connected to the primary bus, the bridge compares the address of the command to the address range defined by the address mapping registers in the bridge. If the address of the command falls within the address range defined by the mapping registers, then the memory or I/O command is passed through the bridge to the secondary bus connected to the bridge. Furthermore, when a memory or I/O command is delivered to the secondary bus connected to the bridge, the bridge compares the address of the command to the address range defined by the mapping registers, and if the address of the command is not within the address range, the command is passed through the bridge to the primary bus connected to the bridge.

Many computing systems include expansion cards which access or communicate with both the processor complex and other expansion cards in the computer system. If an expansion card is not on the same secondary bus as the expansion card that it accesses, e.g., where each card is on its own secondary bus to facilitate hot swapping, this can result in excessive traffic between the expansion cards via the primary PCI bus, introducing latency and making the expansion cards operate in less than an optimal manner.

Therefore, a significant need continues to exist for an improved manner of routing commands between and among computer systems and expansion slots or cards.

SUMMARY OF THE INVENTION

The invention addresses these and other problems associated with the prior art by providing an apparatus and method of routing commands between a computer system and an expansion slot or card.

In accordance with the present invention, a primary bus and first and second secondary busses are interconnected by a routing circuit. The routing circuit functions as a bridge between the primary bus and each of the first and second secondary busses, respectively, by associating each secondary bus with an address range, and forwarding a command received from the primary bus to a secondary bus mapped to an address range including the address of the command. Furthermore, the routing circuit forwards from a secondary bus, commands intended for the primary bus. In addition, the routing circuit directly routes to the second secondary bus, a command received from the first secondary bus addressed for the second secondary bus, without use of the primary bus. As a result, traffic and latency on the primary bus is reduced and efficiency is increased.

In the specific embodiment described below, the routing circuit incorporates control registers specifying address ranges on the primary bus which map to the first and second secondary bus, and a routing table specifying address ranges on each secondary bus which map to the primary bus or to other secondary busses. A control circuit compares the address of a command received from the primary bus to the control registers, to identify the secondary bus (if any) to which the command should be forwarded. Furthermore, the control circuit compares the address of a command received from the secondary bus, to the routing address ranges in the routing table, to determine the bus (if any) to which the command is to be directed. A command received from the first secondary bus with an address in the address range mapped in the routing table to the second secondary bus, is directly routed to the second secondary bus without use of the primary bus. Furthermore, a command received from the second secondary bus with an address in the address range of the first secondary bus, is directly routed to the first secondary bus without use of the primary bus.

In this specific embodiment, there are eight secondary busses, each connected to the routing circuit. The routing table includes entries specifying, for each secondary bus, address ranges which map to any or all of the other secondary busses and the primary bus. A command from a secondary bus with an address in one of the ranges specified in entries for that secondary bus, is directly routed to the bus mapped by the address range.

The routing table entries further specify an address offset to be applied to forwarded commands. Accordingly, a command from a secondary bus with an address in a range associated with an address offset, is modified by the control circuit using the address offset, to have a new address, and then directly routed to the bus mapped by the address range.

The routing table entries also include additional information, such as whether and to what extent a memory read command routed through the routing circuit to a destination bus, should be expanded to pre-fetch additional memory locations not initially requested by the command. The routing table entries further describe different pre-fetch actions to be performed for read operations of different sizes. Further, the routing table entries identify whether and to what extent multiple memory write commands to the same destination bus routed through the routing circuit should be buffered and combined into a single write command of greater size. To facilitate these functions, the routing circuit incorporates a data buffer for buffering data prefetched in response to a read command, or received but not yet delivered in response to a write command.

The routing circuit further includes an enable register for controlling the use of entries in the routing table to alter the routing of commands between the primary and secondary busses. Specifically, for each secondary bus, the enable register identifies which of the entries in the routing table are enabled and should have their address ranges compared to the address of a command received from the secondary bus. In some cases, all of the eight address ranges may be disabled, in which case, commands from the secondary bus are routed to the primary bus only if the address of the command is not in the range specified by the control registers associated with the secondary bus.

In additional aspects, the invention features the methods used by the above-described routing circuit.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIGS. 4A, 4B and 4C are detailed data structure diagrams of the data structures illustrated in FIG. 3.

DETAILED DESCRIPTION

Figure 1:
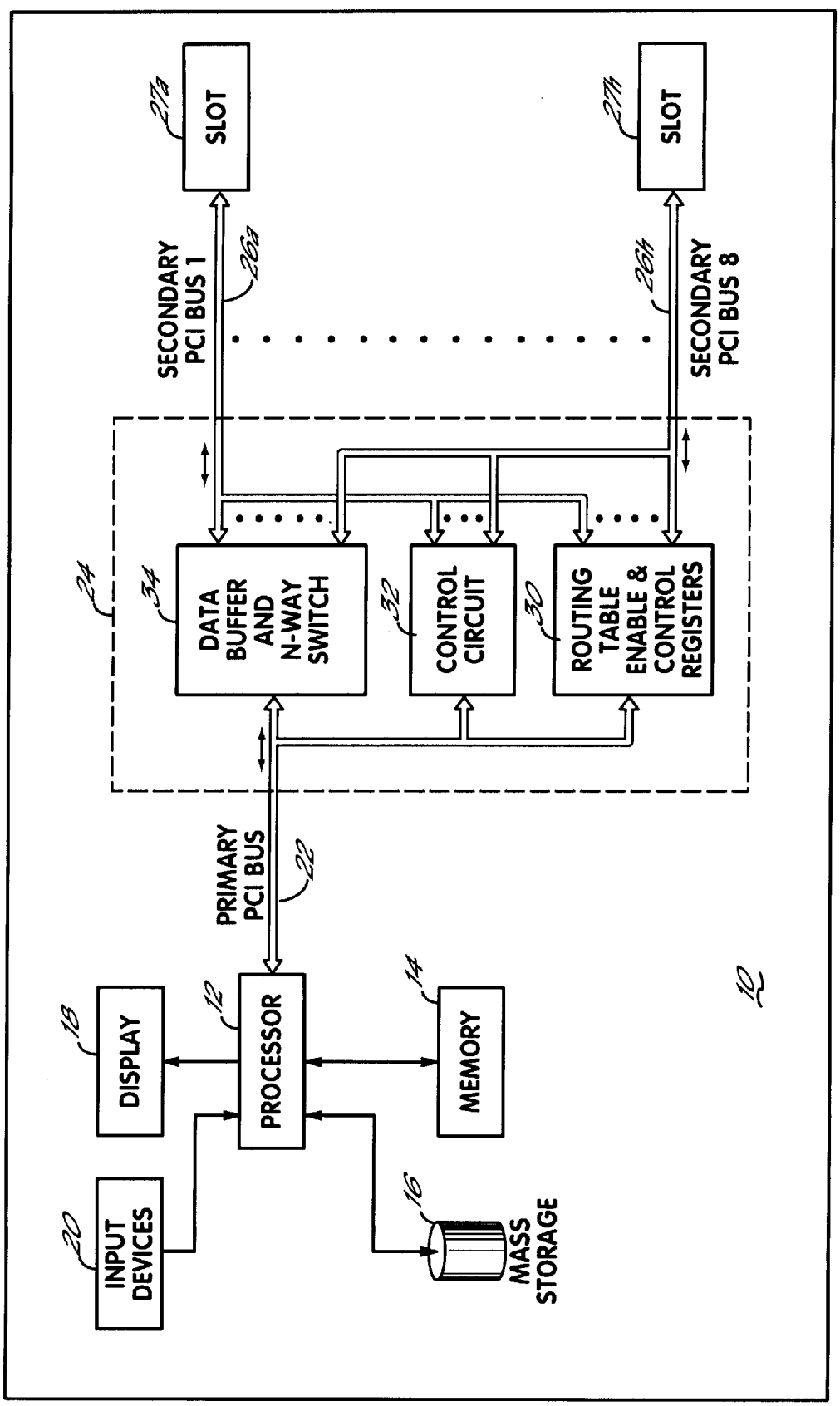
FIG. 1 is a block diagram of a computer system including a routing circuit consistent with the invention, being used as an expansion slot interface.

Turning to the Drawings, wherein like numbers denote like parts throughout the several views, FIG. 1 illustrates a computer system 10 consistent with the invention. However, those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Computer system 10 comprises a processor 12 and its accompanying circuitry. Processor 12 interacts with a memory 14 for storing and retrieving data as part of data processing operations it is carrying out. Memory 14 may include high volume storage such as DRAM as well as various caches of high-speed storage such as SRAM. Data may also be stored in and retrieved from a mass-storage device 16, which may be a magnetic hard disk or an optical drive, or both. Mass storage device 16 may be connected to processor 12 through the PCI interface described below, or may have a separate interface as is shown in FIG. 1. In addition, processor 12 utilizes a display 18, such as a CRT, for displaying information to the user. Processor 12 also utilizes various input devices 20 such as a keyboard, mouse, scanner or video camera to receive data from the user for processing. Some or all of these input devices may also be connected to processor 12 through the PCI interface described below, or may have a separate interface as is shown in FIG. 1.

Processor 12 is further connected to a primary PCI bus 22 for communicating with various input/output adapters. Primary PCI bus 22 connects to a routing circuit 24 for routing PCI commands between primary bus 22 and eight secondary busses 26a through 26h in accordance with principles of the present invention. Each secondary bus 26a through 26h may be connected to one or more devices connected to slots 27a through 27h, so that these devices may communicate with processor 12 through routing circuit 24.

Routing circuit 24 includes a data buffer and N-way switch circuit 34 for transferring PCI commands and data between primary PCI bus 22 and secondary PCI busses 26a through 26h. The N-way switch component of circuit 34 includes functionality for transferring commands and data directly from any of secondary PCI busses 26a through 26h to any other of the secondary busses PCI busses 26a through 26h, as well as functionality for transferring commands and data from or to any one secondary PCI bus 26a through 26h to or from primary PCI bus 22. The N-way switch component of circuit 34 accordingly comprises a plurality of multiplexers, the multiplexers collectively permitting commands or data received from any one of the eight secondary busses 26a–26h or primary bus 22, to be delivered to any one of eight secondary busses 26a–26h or primary bus 22, and also permitting data received from any one of the eight secondary busses 26a–26h or primary bus 22, to be stored in the data buffer component of circuit 34.

The operations of data buffer and N-way switch circuit 34 are controlled by a control circuit 32, which is responsive to commands received from primary PCI bus 22 as well as from each secondary PCI bus 26a–26h, to appropriately route these commands and the accompanying data to or from appropriate busses. Control circuit 32 comprises a plurality of hardware sequencers and state machines which process commands received from one of busses 22 and 26a–26h and performs the appropriate responsive actions. The operations of control circuit 32 will be elaborated in detail below in connection with FIGS. 5A through 5C.

The configuration of routing circuit 24 is determined by the contents of various registers in a memory 30, which stores a routing table as well as various enable and control registers. The details of the meaning and format of these registers will be elaborated below in connection with FIGS. 3 and 4A through 4C, and their use will be explained in connection with FIGS. 5A through 5C. As can be seen in FIG. 1, memory 30 is connected to the primary PCI bus 22 as well as to secondary PCI busses 26a–26h, so that the registers in memory 30 which determine the configuration of routing circuit 24 can be accessed, according to the PCI standard, through memory commands directed to a special address on the PCI bus known as BAR0. By accessing these registers via the BAR0 address, the processor or a device connected to primary bus 22 or any one of secondary busses 26a–26h may alter the configuration of routing circuit 24 to provide a desired functionality.

Figure 2A:
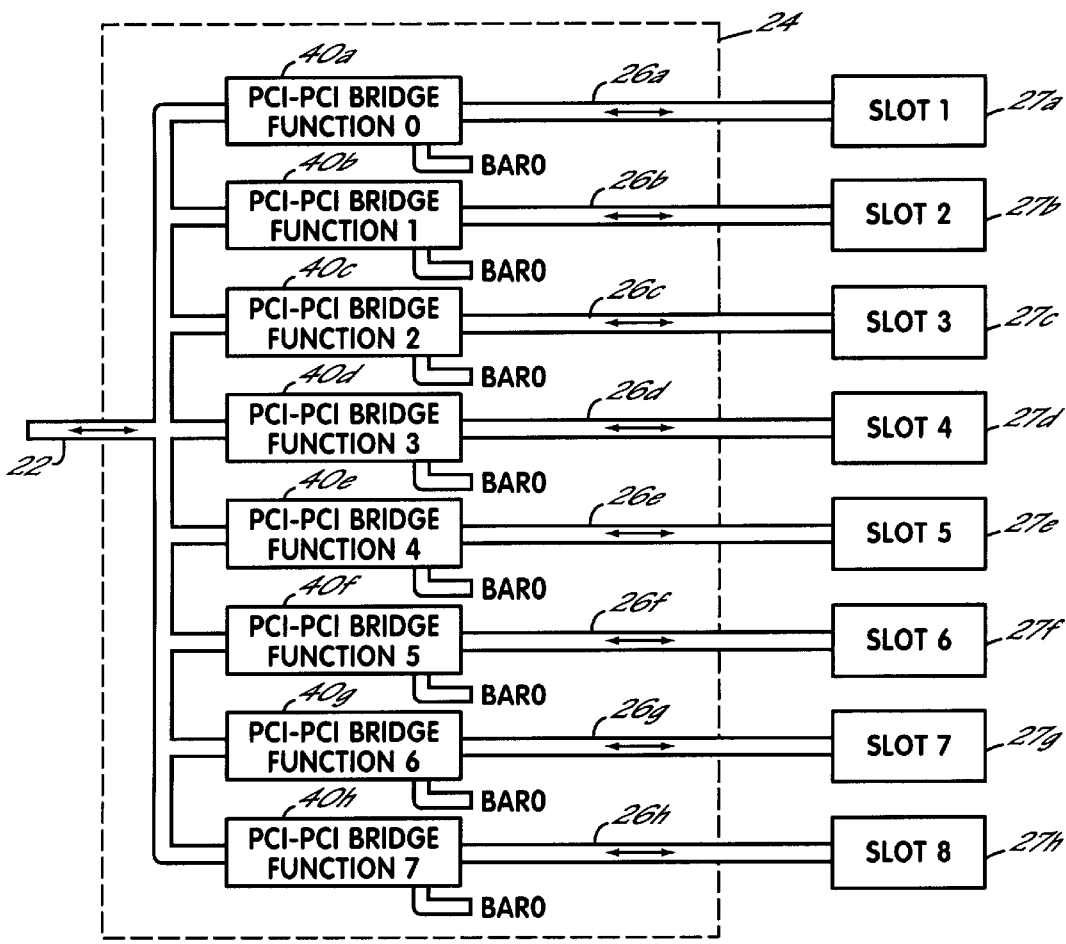
FIGS. 2A, 2B and 2C are functional diagrams of first, second and third configurations of the routing circuit of FIG. 1.

Through manipulation of the contents of the registers in memory 30, various configurations of routing circuit 24 can be accomplished. For example, as shown in FIG. 2A, in the least complex configuration, routing circuit 24 may operate as eight switched PCI—PCI bridge circuits, each configurable through the BAR0 address on the PCI busses. As discussed above, in accordance with the PCI standard, each switched bridge 40a–40h is responsive to control registers, configurable through the BAR0 address, which identify an address range in the address space of the primary PCI bus. If a command on the primary PCI bus has an address within the address range, the command is forwarded through the switched bridge to the secondary bus. If a command is received from the secondary bus, and the address of the command is not within the address range defined for the secondary bus by the control registers, the command is forwarded through the switched bridge 40a–40h to the primary bus.

Figure 2B:
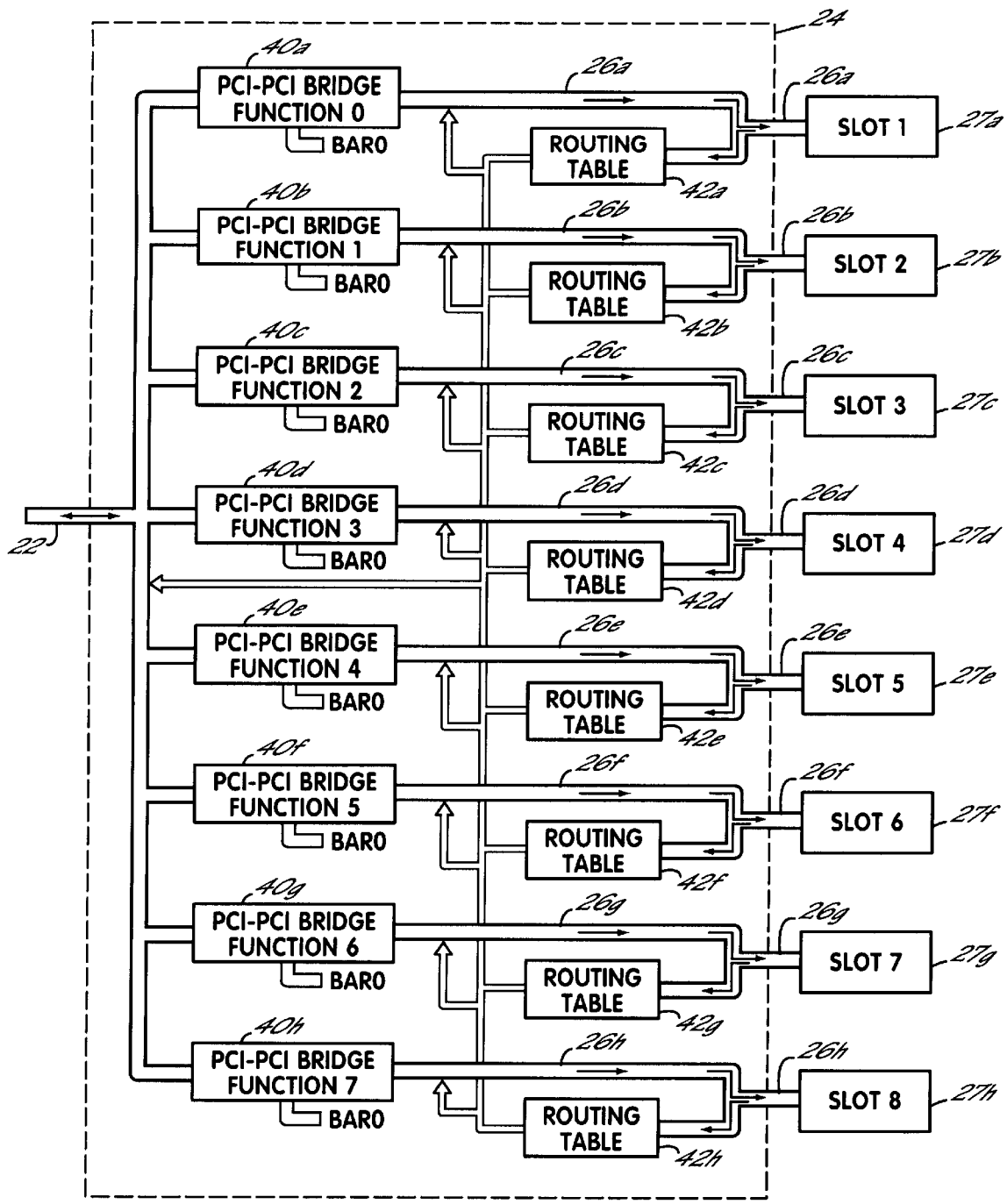

Referring to FIG. 2B, in a more complex configuration, routing circuit 24 may provide, in addition to the functionality of eight switched PCI—PCI bridge circuits, additional direct routing between the secondary busses 26a–26h utilizing routing tables stored in memory 30. In this configuration, with respect to commands received from primary bus 22, routing circuit 24 continues to behave as eight switched PCI—PCI bridge circuits coupled between primary bus 22 and secondary busses 26a–26h, utilizing address ranges defined by control registers. That is, commands which fall within the address range of a secondary bus 27a–27h, as defined by the standard PCI control registers for that secondary bus, are forwarded to that secondary bus 27a–27h. However, with respect to commands received from one of the secondary busses 26a–26h, routing circuit 24 provides additional functionality. Specifically, commands received from secondary busses 26a–26h are routed based upon address ranges and other information found in a routing table 42a–42h associated with the secondary bus. Based upon the address ranges defined by the routing table 42a–42h for the secondary bus from which the command was received, the command will be forwarded, via a switched connection 44 which circumvents the PCI—PCI bridges 40a–40h, to another one of the secondary busses 26a–26h or to primary bus 22. Generally, the routing tables 42a–42h define address ranges for commands received from the associated secondary bus 26a–26h, and for each address range, identify the bus, either primary bus 22 or one of secondary busses 26a–26h, to which the command is to be forwarded.

Figure 2C:
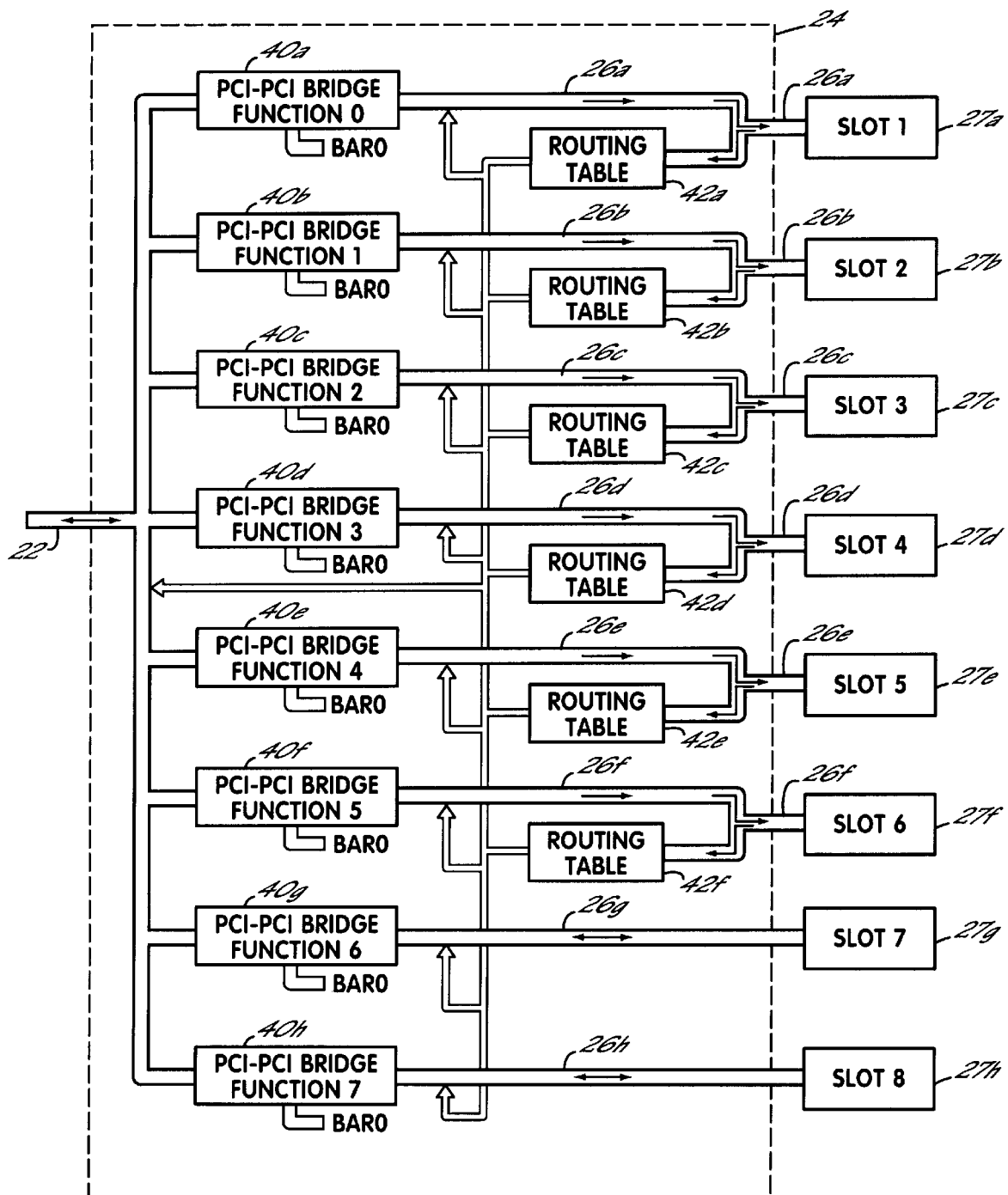

It will be noted from the following that routing circuit 24 may be configured to have different behaviors with respect to different secondary busses. For example, as shown in FIG. 2C, the routing tables 42g and 42h may be disabled, causing the behavior of routing circuit 24, with respect to commands received from secondary busses 26g and 26h, to revert to that of two switched PCI—PCI bridges 40g and 40h, as described above in connection with FIG. 2A. Specifically, upon receipt of a command from a secondary bus 26g or 26h, the command is routed to primary bus 22 according to the PCI standard bridge definition only if the address of the command is outside of the address associated with the secondary bus 26g or 26h within the control registers of the relevant switched PCI—PCI bridge 40g or 40h. However, it will be noted that, although routing tables 42g and 42h are disabled, the other routing tables 42a–42f may continue to define address ranges which are mapped to secondary busses 26g or 26h, in which case a command received from a secondary bus 26a–26f matching an address range in the associated routing table 42a–42f which maps to one of secondary busses 26g or 26h, will be forwarded by routing circuit 24 directly to secondary bus 26g or 26h.

Before proceeding, a brief background discussion of PCI standard commands and nomenclature will prove useful. The PCI standard defines protocols for transmitting memory and input/output access commands over PCI busses between a processor complex and various peripheral devices and/or memory. PCI commands are categorized at a high level into memory cycle commands, i.e., commands that store or retrieve memory locations, and I/O commands, i.e., commands that deliver instructions or obtain data from input/output devices such as network interface cards. Both types of commands have addresses which identify the memory location or I/O device to be accessed.

The PCI standard permits two kinds of memory access over the PCI bus, which can generally be described as delayed operations and posted operations. However, according to the PCI standard, I/O accesses are always posted operations.

In a delayed operation, the device generating the command (known as the "master") will receive an acknowledgment that the command has been executed, i.e., that the addressed memory locations have been written with the data delivered with the command, or that the addressed memory locations have been read. Thus, a delayed operation can be used, for example, when the master must wait until the requested operation is completed, before proceeding to the next operation. As just one example, a delayed operation could be used when the master writes a memory location and immediately reads back that memory location for processing.

The master initiates an operation by delivering a command to the bus. In response, the device receiving the command (known as the "target") receives and queues the command for execution, and determines the command will or will not be a delayed operation. If the target determines the command will be a delayed operation, the target returns a Retry message over the PCI bus. Having received the Retry message, the master will subsequently and regularly resubmit the delayed operation command to the PCI bus. So long as the queued command has not be executed by the target, the target will continue to return Retry messages to the master. However, once the target has executed the command, the target will respond appropriately to the resubmitted delayed operation command from the master. Specifically, if the delayed operation command is to write identified memory locations, once the locations have been written, the target will respond with a status word indicating the locations have been written. If the delayed operation command is to read identified memory locations, once the locations have been read, the target will respond with the data read from those locations.

A posted operation differs from a delayed operation in that the master does not receive acknowledgment that the operation has been completed. Rather, for example, when a posted write operation is delivered by the master to the PCI bus, the target responds by receiving the data to be written and returning a status word indicating that the data has been received. Thereafter, the master does not resubmit any commands to the PCI bus related to the posted operation, and the target does not return any status acknowledgment when the operation has been completed.

In addition to the foregoing, the PCI standard anticipates that some computer systems may operate in a double-width addressing mode, in which all memory addresses are twice the width of the PCI bus, e.g., 64 bits in width, whereas other computer systems may operate in a single-width addressing mode, in which memory addresses are the same width as the PCI bus, e.g., 32 bits in width. Accordingly, the PCI standard provides for a dual address cycle (DAC) mode in which two bus cycles are used to transfer a memory address over the bus, as well as a non-DAC address cycle mode in which only one bus cycle is used to transfer a memory address over the bus. These modes must be handled differently by PCI bridges and other PCI-compliant devices, in that the address ranges defined by a bridge must be double-width when DAC mode is being used.

Figure 3:
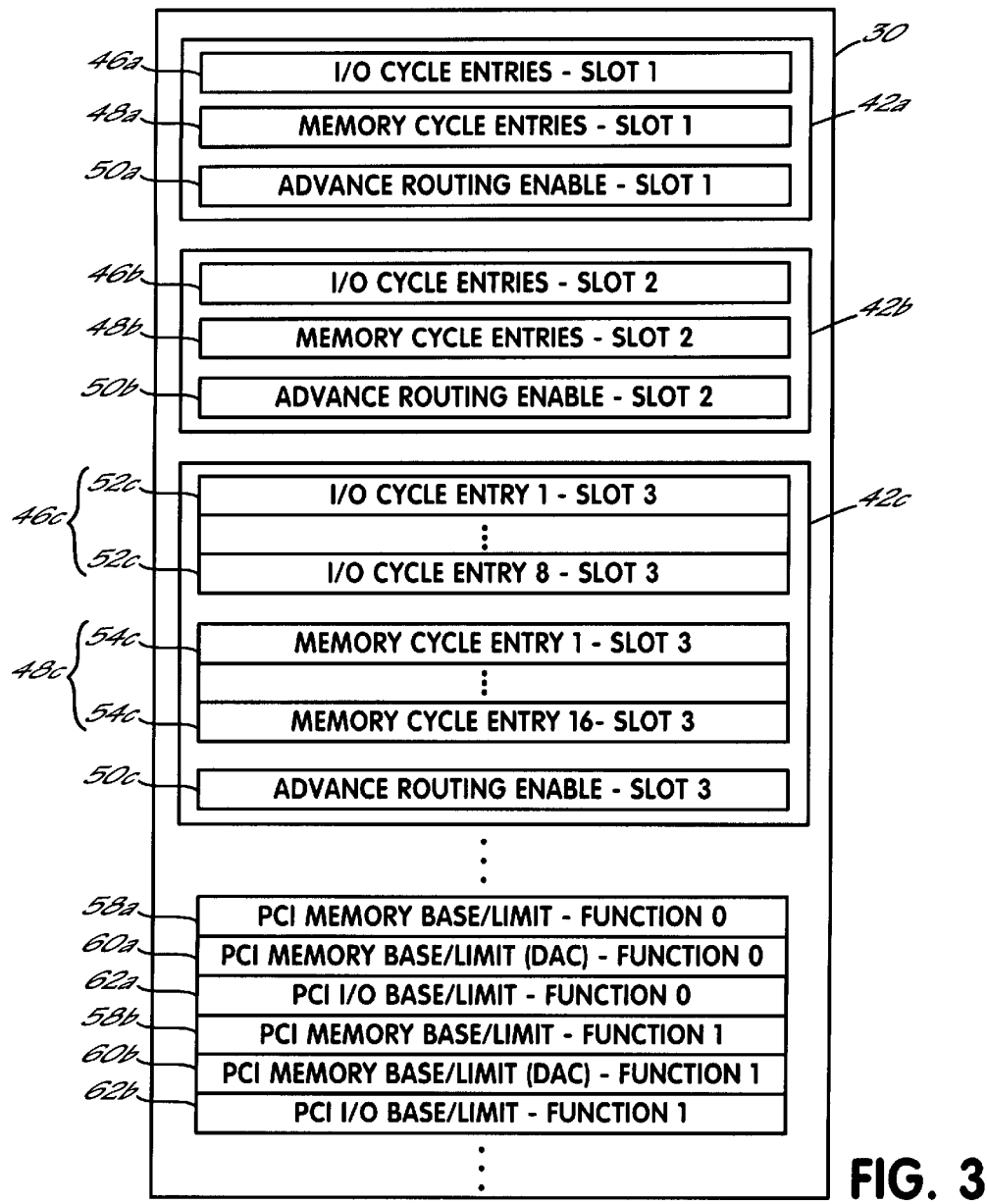
FIG. 3 is a high-level data structure diagram of data stored in the routing table and enable register memory of the routing circuit of FIG. 1.

With this background, now referring now to FIG. 3, the registers in memory 30 which define the behavior of routing circuit 24 can be described in more detail.

Specifically, these registers include data forming the routing tables 42a, 42b, 42c etc. Each routing table 42 includes entries 46a, 46b, 46c, etc. respectively, identifying address ranges for I/O commands which map to other secondary busses 26a–26h and/or to the primary bus 22. As is shown in detail in FIG. 3 with respect to routing table 42c for slot 27c, the I/O command entries 46 for every slot include eight entries 52, each entry 52 identifying a particular address range on the associated secondary bus, and identifying the bus to which that address range is mapped. Since there are eight I/O command entries 52, eight address ranges can be defined to map to other secondary busses 26a–26h and/or to primary bus 22. Since there are seven other secondary busses 26 and the primary bus 22, this means that one address range can be mapped to every one of the other busses reachable through routing circuit 24. Alternatively, two or more address ranges can be mapped to the same bus, although in such a case at least one of the six remaining secondary busses 26 and primary bus 22 will not have an address range mapped to it. Further detail on the format and content of I/O command entries 46 is provided below with reference to FIGS. 4B and 4C.

Each routing table 42 also includes memory cycle entries 48a, 48b, 48c, etc., identifying address ranges for memory commands which map to other secondary busses 26a–26h and/or to the primary bus 22. As is shown in detail in FIG. 3 with respect to routing table 42c for slot 27c, the memory cycle entries 48 for every slot include, in non-DAC addressing mode, sixteen entries 54, each entry 54 identifying a particular address range on the associated secondary bus, and identifying the bus to which that address range is mapped. Since, in non-DAC address mode, there are sixteen memory cycle command entries 54, sixteen address ranges can be defined to map to other secondary busses 26a–26h and/or to primary bus 22. Since there are seven other secondary busses 26 and the primary bus 22, this means that, in non-DAC addressing mode, two address ranges can be mapped to every one of the other busses reachable through routing circuit 24. Alternatively, three or more address ranges can be mapped to the same bus, although in such a case at least one of the six remaining secondary busses 26 and primary bus 22 will have only one address range mapped to it. Further detail on the format and content of memory cycle command entries 48 when in non-DAC addressing mode is provided below with reference to FIG. 4B.

As noted above, the PCI standard defines a DAC mode, and in DAC mode, memory addresses are double-width, and accordingly address ranges must be of double width to facilitate comparison to memory addresses in commands. As a result, when in DAC mode, the registers storing the memory cycle entries 48 in each routing table 42 are reallocated, such that there are eight double-width memory cycle entries 54 for every slot, each entry 54 identifying a particular double-width address range on the associated secondary bus, and identifying the bus to which that address range is mapped. Since, in DAC mode, there are eight memory cycle command entries 54, eight address ranges can be defined to map to other secondary busses 26a–26h and/or to primary bus 22. Since there are seven other secondary busses and the primary bus 22, this means that, in DAC mode, one address range can be mapped to every one of the other busses reachable through routing circuit 24. Alternatively, two or more address ranges can be mapped to the same bus, although in such a case at least one of the six remaining secondary busses 26 and primary bus 22 will not have an address range mapped to it. Further detail on the format and content of memory cycle command entries 48 when in DAC mode is provide below with reference to FIG. 4C.

As seen in FIG. 3, each routing table 42a, 42b, 42c etc. also includes an advanced routing enable register 50a, 50b, 50c include bits identifying which of the I/O command entries 46 and memory command entries 48 are enabled. Furthermore, the advanced routing enable register identifies other aspects of how commands are to be forwarded, such as specifying whether and how much to prefetch from adjacent memory locations when a memory location is read, and whether and how much to combine write commands addressed to adjacent memory locations.

Figure 4A:
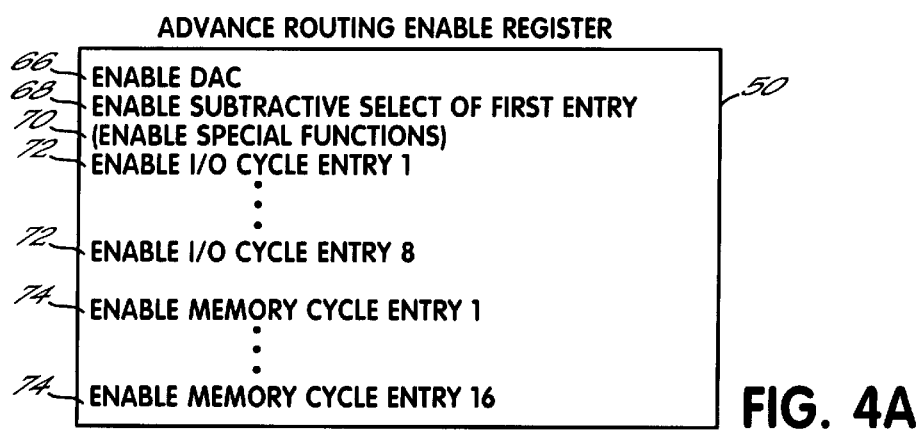

Finally, FIG. 3 illustrates that memory 30 includes standard PCI control registers relating to each switched PCI—PCI bridge 40a–40h. Specifically, there are control registers 58a, 58b, etc. identifying the address range for each switched PCI—PCI bridge 40a–40h when operated in non-DAC address mode, respectively. Furthermore, there are control registers 60a, 60b, etc., identifying the address range for each switched PCI—PCI bridge 40a–40h when operated in DAC mode. Finally, there are control registers 62a, 62b, etc., identifying the address range for each switched PCI—PCI bridge 40a–40h for PCI I/O commands. Referring now to FIG. 4A, the specific format of the Advanced Routing Enable registers 50 can be explained. This is a 32-bit register, individual bits of which indicate particular modes and enable the I/O and memory cycle entries 46 and 48 for the routing table 42 which includes the Advanced Routing Enable register 50.

A first Enable DAC bit 66 of the register indicates whether the routing circuit 24 is in DAC mode, and accordingly indicates the format of the memory cycle entries 48, as discussed below in further detail. When bit 66 is set to a "1" value, then the routing circuit 24 is in DAC mode and the memory cycle entries are interpreted as eight double-width entries.

A second Enable Subtractive Select of First Entry bit 68 is used only in DAC mode routing when the routing table is enabled. This bit, if set to a "1" value, causes a command received from the associated secondary bus 26, which does not match the address range of any enabled memory cycle entry, to be forwarded to the first memory cycle entry if it is enabled. If the first memory cycle entry is not enabled, then the command is ignored.

There is space for 6 additional bits 70 in the Advanced Routing Enable register, which can be used to enable or control special functions if needed.

Following the 6 additional special function bits 70, are eight enable bits 72 for the I/O cycle entries 46. The eight enable bits 72, each correspond to one of the eight I/O cycle entries 46 in the routing table 42 containing the Advanced Routing Enable register 50. An I/O cycle entry is disabled unless the corresponding enable bit 72 is set to a "1" value.

Following the I/O cycle enable bits, are sixteen enable bits 74 for the memory cycle entries 48. In non-DAC addressing mode, the sixteen enable bits 74, each correspond to one of the sixteen memory cycle entries 48 in the routing table 42 containing the Advanced Routing Enable register 50. A memory cycle entry is disabled unless the corresponding enable bit 74 is set to a "1" value. In DAC addressing mode, there are eight memory cycle entries 48, and pairs of enable bits 74 correspond to the eight memory cycle entries 48 in the routing table 42 containing the Advanced Routing Enable register 50. These pairs of bits are set or cleared together when the routing circuit 24 is in DAC mode. In DAC mode, a memory cycle entry is disabled unless the pair of corresponding enable bits 74 are set to a "11" value.

Referring now to FIG. 4B, the format of the I/O and memory cycle entries 46 and 48 of a routing table can be detailed.

The I/O memory cycle entries 46 comprise eight entries 52 having the format illustrated in FIG. 4B. Specifically, each entry comprises two 32-bit registers. The first 32-bit register is divided into two words 80 and 82 which respectively identify the limit and base of an address range. As is conventional under the PCI standard, these words identify only the most significant 16 bits of the 32-bit addresses which form the endpoints of the address range. The limit value specified in word 80 is completed by appending least significant bits having the value ffff hexadecimal to the 16-bits identified in word 80, and the base value specified in word 82 is completed by appending least significant bits having the value 0000 hexadecimal to the 16-bits identified in word 82.

The second 32-bit register of the I/O memory cycle entry 46 comprises a 16-bit word 84 identifying an address delta value. This value is added to the address of any I/O command matching the address range specified in words 80,82. The inclusion of an address delta entry permits routing circuit 24 to be configured to shift addresses as part of passing a command through routing circuit 24. The 16-bit word 84 specifies the most significant bits of the 32-bit address delta value. The address delta is completed by appending least significant bits having the value 0000 hexadecimal to the 16-bits identified in word 84. The next four bit word 86 identifies which of the eight other slots of routing circuit 24 should receive I/O commands matching the address range defined in the I/O cycle entry 46. Thus, each I/O cycle entry can define an address range and a destination for I/O commands matching the defined address range.

FIG. 4B also shows the format of memory cycle entries 48 when in non-DAC addressing mode. In this mode, the memory cycle entries 48 comprise sixteen memory cycle entries 54, each having the format illustrated in FIG. 4B. Specifically, each entry comprises two 32-bit registers. The first 32-bit register is divided into two words 88 and 90 which respectively identify the limit and base of an address range. As before, these words identify only the most significant 16 bits of the 32-bit addresses which form the endpoints of the address range. The limit value specified in word 88 is completed by appending least significant bits having the value ffff hexadecimal to the 16-bits identified in word 88, and the base value specified in word 90 is completed by appending least significant bits having the value 0000 hexadecimal to the 16-bits identified in word 90.

The second 32-bit register of the memory cycle entry 54 comprises a 16-bit word 92 identifying an address delta value. This value is added to the address of any memory cycle command matching the address range specified in words 88 and 90. The 16-bit word 92 specifies the most significant bits of the 32-bit address delta value. The address delta is completed by appending least significant bits having the value 0000 hexadecimal to the 16-bits identified in word 92.

The next four bit word 94 identifies which of the eight other slots of routing circuit 24 should receive memory cycle commands matching the address range defined in the memory cycle entry 48. Thus, each memory cycle entry can define an address range and a destination for I/O commands matching the defined address range.

The next three bit word 96 identifies the prefetch size to be used when data is read in response to a PCI read command. If a read command matches the memory address range defined in the memory cycle entry 54, then the read command will be expanded according to the prefetch size encoded in these three bits, to prefetch and buffer additional data. The routing circuit 24 will fetch from the starting address up to the address boundary defined by the prefetch size. A value of "000" sets a boundary at 4 bytes, prefetching only on delayed read operations; a value of "001" sets a boundary at 16 bytes; a value of "010" sets a boundary at 32 bytes; a value of "011" sets a boundary at 64 bytes; a value of "100" sets a boundary at 128 bytes; a value of "101" sets a boundary at 256 bytes; a value of "110" sets a boundary at 512 bytes. A value of "111" causes continuous prefetching—in this mode, routing circuit 24 will prefetch 512 bytes, then when the first word of that 512 bytes is accessed, another 512 byte prefetch will occur. When the first word of that 512 bytes is access, another 512 byte prefetch will occur. This continues until the accesses cease or a 4 kbyte address boundary is reached. A prefetched buffer will be discarded if it is not accessed in less than $30 \times 2^{15}$ nanoseconds. After being accessed, the buffer will be discarded after a programmable number of microseconds, typically about 10 microseconds. The prefetch buffer is also discarded if the access pattern backs up, fetches the same location twice, or jumps ahead discontiguously. Subsequent buffers fetched as part of continuous mode operation are discarded if not first used in a programmable number of microseconds, typically about 10 microseconds.

The next three-bit word 98 identifies the prefetch size to be used when data is read in response to a PCI read-line command. These three bits are encoded identically to the three bits in word 96.

Then next three-bit word 100 identifies the prefetch size to be used when data is read in response to a PCI read-multiple command. These three bits are encoded identically to the three bits in words 96 and 98.

The last three-bit word 102 identifies the type of write cycles which are supported and the extent to which write operations are combined by routing circuit 24. Posted write operations are discarded if not completed in less than $30 \times 2^{15}$ nanoseconds. When the first bit of this three bit word is "0", then only delayed write operations of a single data cycle, non-burst, will be supported. Otherwise, when the three-bit word 102 has the value "100", then posted write operations will be accepted, with combining to a 128-byte boundary; when word 102 has the value "101", then posted write operations will be accepted, with combining to a 256-byte boundary; when word 102 has the value "110", then posted write operations will be accepted, with combining to a 512-byte boundary; when word 102 has the value "111", then posted write operations will be accepted, without combining, to a 512-byte boundary. Combining, when enabled, will occur if a write does not fill the 128/256/512 byte buffer. After a burst, the routing circuit 24 will initiate a time-out timer to wait for a programmable number of microseconds, typically 10 microseconds, to see if the operation will be continued at or within, e.g., four bytes of where it left off. If the write operation is continued, then the same buffer is used and the two bursts are combined into one. Any other operation (such as a re-write over previously written data, or a write to a location outside of the combining boundary) will not be combined, and the buffered data will be sent to its target. When a write reaches the end of an address boundary, then it is sent on its way without delay. Combining is useful when the device writes large blocks of data using a small burst size of, e.g., 64 or 128 bytes.

Referring now to FIG. 4C, the format of I/O cycle entries 46 and memory cycle entries 48 when in DAC mode can be explained. It will be noted that, in DAC mode, the I/O cycle entries 46 have the same format as explained above with reference to FIG. 4B. Accordingly, this explanation will not be repeated.

In DAC mode, each memory cycle entry comprises four 32-bit registers, rather than only two as shown in FIG. 4C. As a result, the thirty-two registers which provide sixteen memory cycle entries 48 available in non-DAC addressing mode, provide only eight memory cycle entries 48 in DAC mode. In DAC mode, the memory cycle entries include words 88, 90, 92, 94, 96, 98, 100 and 102 as described above. Words 92, 94, 96, 98, 100 and 102 are used in identical fashion as described above with reference to FIG. 4B; accordingly, this explanation will not be repeated. Words 88 and 90 define a limit and base as is the case in non-DAC addressing mode, however, in DAC mode, these words define only the less-significant halves of the limit and base addresses of the address range mapped by the memory cycle entry 54. As described above, the limit address is completed by appending the sixteen-bit value ffff hexadecimal to the value in word 88, and the base address is completed by appending the sixteen-bit value 0000 hexadecimal to the value in word 90. The more significant halves of the limit and base addresses are defined by 32-bit words 104 and 106, respectively, which are stored in a second pair of 32-bit registers used in DAC mode.

With this backdrop, the detailed operations of routing circuit 24 can now be explained. The following explains the operations of control circuit 32 of routing circuit 24 in response to receipt of commands from primary bus 22 and secondary busses 26. It will be appreciated that although these operations are described as sequential operations, because control circuit 32 is a hardware device comprising multiple state machines several of the operations that are shown as sequentially performed in the flow charts may also be performed in parallel for greater efficiency.

Figure 5A:
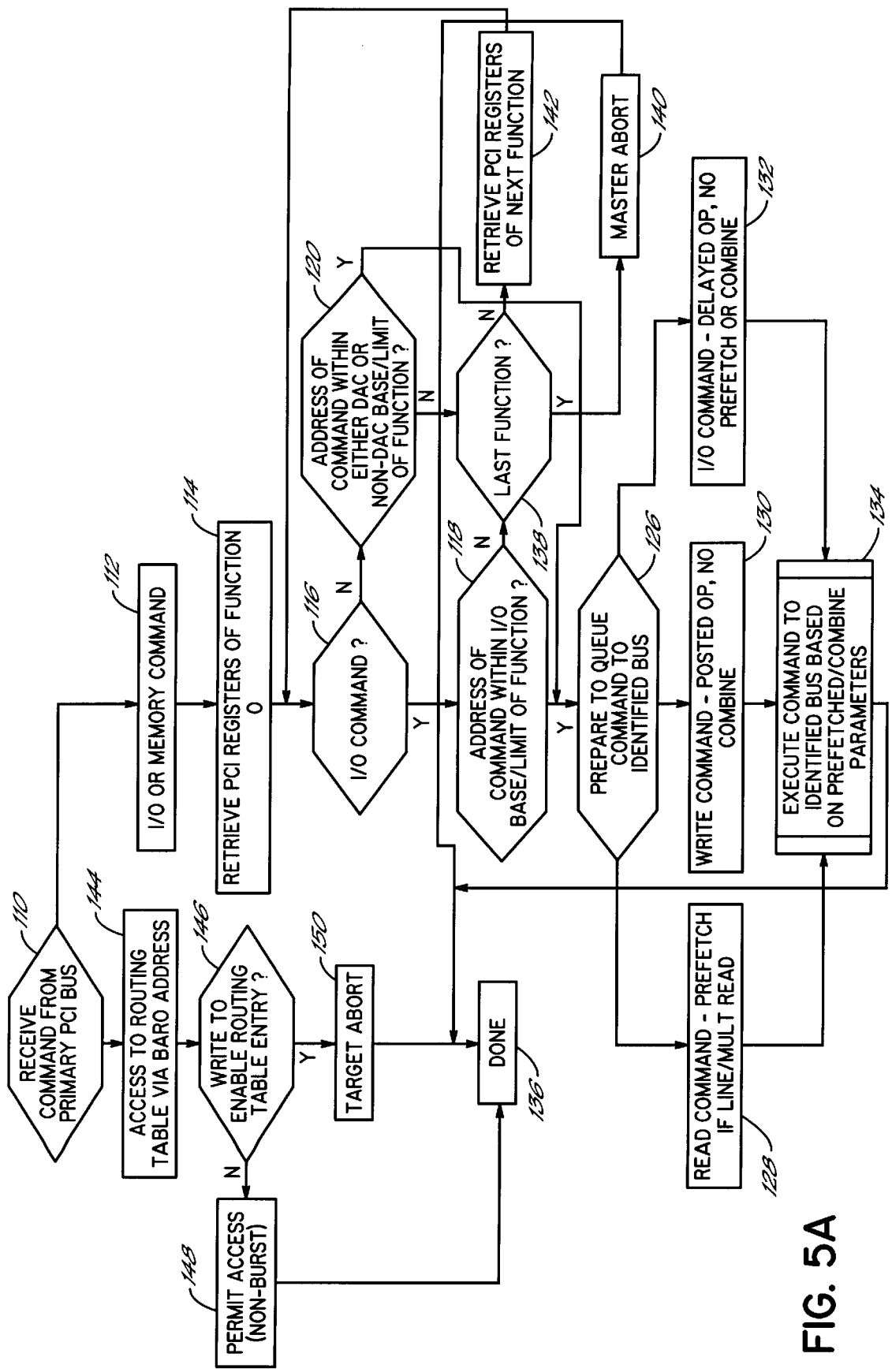
FIG. 5A is a flow chart illustrating the operations performed by the routing circuit of FIG. 1 upon receipt of a command from the primary PCI bus.

Referring to FIG. 5A, the operations of routing circuit 24 in response to a command from the primary PCI bus, cause the routing circuit 24 to emulate eight switched PCI—PCI bridges 40a–40h as discussed above with reference to FIGS. 2A–2C.

Accordingly, when a command is received (step 110), if the command is a I/O or memory command (step 112), then routing circuit 24 compares the address of the command to the PCI control registers for each switched bridge function 40a–40h that is emulated by routing circuit 24. Accordingly, the control registers for the first function are retrieved (step 114) and the address base/limit range defined by the appropriate control register is compared to the address of the command. If the command is an I/O command (step 116), the address of the command is compared to the I/O base/limit control register 62 of the function (step 118). If the command is a memory command and routing circuit 24 is in DAC mode, then the address of the command is compared to the DAC base/limit control register 60 for the function; if routing circuit 24 is not in DAC mode, then the address of the command is compared to the non-DAC base/limit control register 58 of the function (step 120). In any of the above cases, if the command matches the appropriate base/limit control register for the current function, then preparations are made to queue the command to the bus associated with the control register (step 126). Specifically, memory read-line or read-multiple commands are prefetched in accordance with the PCI standard bridge definition (step 128). Write commands (whether a posted or delayed operation) are passed through the switched PCI—PCI bridge as a posted operation, and no combining is performed (step 130). I/O commands are passed through the commands as delayed operations, and no prefetching or combining is performed (step 132). Thereafter, routing circuit 24 executes the command on the identified target secondary bus 26 based on the defined prefetch and combine parameters (step 134), and processing is done (step 136). Further details on the execution of the command on the identified target bus are provided below in connection with FIG. 5C.

If a command does not match the appropriate base/limit control register for the current function, and if the current function is the last function (step 138), then the address does not match any of the base/limit ranges of the eight switched PCI—PCI bridge functions. Accordingly, in these conditions a master abort is executed (step 140), ignoring the command, and processing is done (step 136). If, however, the current function is not the last function, then the control registers for the next function are retrieved (step 142), and the appropriate one of these control registers is compared to the command address.

Commands directed to the routing table via the BAR0 address (step 144) are handled separately from other commands. These commands are evaluated (step 146) to determine whether the routing table entry that is sought to be written by the command is currently enabled, i.e., if the corresponding enable bit 72 or 74 is set to a "1" value. If the command is an attempt to overwrite an enabled routing table entry, then the command is ignored by executing a target abort (step 150), and processing is done (step 136). If, however, the command is not attempting to overwrite an enabled routing table entry, then access is permitted in a non-burst mode (step 148), to permit a write to the routing table entry identified in the command.

Figure 5B:
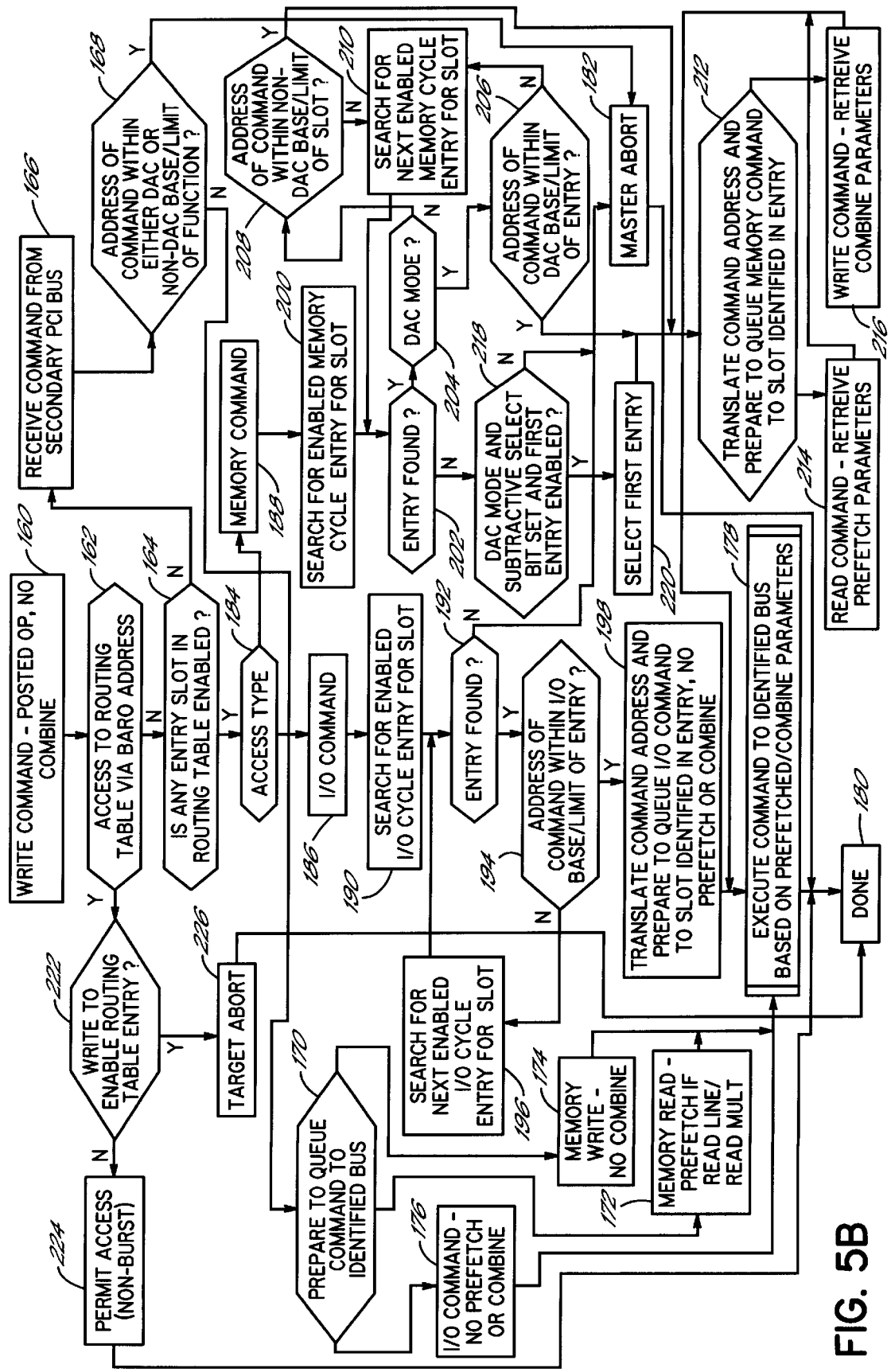
FIG. 5B is a flow chart illustrating the operations performed by the routing circuit of FIG. 1 upon receipt of a command from the secondary PCI bus.

FIG. 5B illustrates actions taken when a command is received from a secondary bus 26a–26h by routing circuit 24. Accesses to the routing table via the BAR0 configuration address are identified (step 162) and handled separately from I/O or memory commands. If the command is a I/O or memory command, then control circuit 32 of routing circuit 24 evaluates (step 164) the routing circuit enable registers 50 to determine if there are any enabled entries in the routing table for the secondary bus from which the command was received. In this step, when an I/O command is received, the I/O entry enable bits 72 of the Advanced Routing Enable Register 50 are evaluated to determine whether any bit has a "1" value; when a memory command is received, the memory cycle entry enable bits 74 of the Advanced Routing Enable Register 50 are evaluated to determine whether any bit has a "1" value.

If there are no enabled entries in the routing table, then the command is routed in accordance with the standard operation of a PCI bridge. Specifically, the control circuit 32 retrieves (step 166) the PCI control registers 58, 60, 62 for the switched bridge 40 connected to the secondary bus from which the command was received. Then, control circuit 32 compares the address of the command to the PCI control registers for the switched bridge (step 168). Specifically, if the command is an I/O command, the address of the command is compared to the base/limit range defined in the PCI control register 62. If the command is a memory command in non-DAC mode, the address of the command is compared to the base/limit range defined in the PCI control register 58. If the command is a memory command in DAC mode, the address of the command is compared to the base/limit range defined in the PCI control register 60. As a result of this comparison, if the address of the command is not in the base/limit range defined by the PCI control register, then the command should be routed to the primary bus. In this case, preparations are made to queue the command to the bus associated with the control register (step 170). Specifically, memory read-line or read-multiple commands are prefetched in accordance with the PCI standard bridge definition (step 172). Write commands (whether a posted or delayed operation) are passed through the switched PCI—PCI bridge as a posted operation, and no combining is performed (step 174). I/O commands are passed through the commands as delayed operations, and no prefetching or combining is performed (step 176). Thereafter, routing circuit 24 executes the command on the primary bus 22 based on the defined prefetch and combine parameters (step 178), and processing is done (step 180). Further details on the execution of the command on the identified target bus are provided below in connection with FIG. 5C.

If, in step 168, the command does match the appropriate base/limit control register, a master abort is executed (step 182), ignoring the command, and processing is done (step 180).

The foregoing steps are taken only when all routing table entries are disabled. If there are enabled routing table entries, then, based on the access type (step 184), processing proceeds to step 186 for I/O commands or to step 188 for memory commands.

When an I/O command is received and there is at least one enabled I/O cycle entry in the routing table, control circuit 32 locates the first enabled I/O cycle entry 52 in the routing table for the secondary bus/slot from which the command was received (step 190). When an entry 52 is found (step 192), the address of the command is compared to the base/limit address range 80/82 defined by the entry 52 (step 194) to determine whether the address of the command matches this range. If not, then control circuit 32 searches (step 196) for the next I/O cycle entry 52 in the routing table for the secondary bus/slot from which the command was received, and returns to step 192.

If, in step 194, the address of the command is found to be within the base/limit address range 80/82 of an I/O cycle routing table entry 52, then the address of the command is translated as defined by the I/O address delta word 84 of the matching entry, and preparations are made to queue the I/O command to the slot identified in word 86 of the matching entry, without prefetching or combining (step 198). Processing then proceeds to step 178 to execute the command to the identified bus, as elaborated below in connection with FIG. 5C.

If, in step 192, no further I/O cycle entries are located, then the I/O command does not match any entries in the routing table. In this condition, a master abort is executed (step 182), ignoring the command, and processing is done (step 180).

When a memory command is received and there is at least one enabled memory cycle entry in the routing table, control circuit 32 locates the first enabled memory cycle entry 54 in the routing table for the secondary bus/slot from which the command was received (step 200). When an entry 54 is found (step 202), if routing circuit 24 is in DAC mode (step 204), the address of the command is compared to the DAC base/limit address range 88/90/104/106 defined by the entry 54 (step 206) to determine whether the address of the command matches this range. If the routing circuit is in non-DAC mode, the address of the command is compared to the non-DAC base/limit address range 88/90 defined by the entry 54 (step 208). In either case, if the address of the command does not fall within the base/limit address range defined by the entry 54, then control circuit 32 searches (step 210) for the next memory cycle entry 54 in the routing table for the secondary bus/slot from which the command was received, and returns to step 202.

If, in step 206 or 208, the address of the command is found to be within the DAC or non-DAC base/limit address range 80/82 of a memory cycle routing table entry 54, then the address of the command is translated as defined by the memory address delta word 92 of the matching entry, and other preparations are made to queue the memory command to the slot identified in word 94 of the matching entry (step 212). Furthermore, for read commands, the prefetch parameters identified in words 96, 98 and 100 are retrieved to determine whether and to what extent the amount of memory read should be expanded to provide prefetching (step 214). For write commands, the combine parameters identified in word 102 are retrieved to determine whether and to what extent to combine the write command with other write commands in the buffer before writing the associated data (step 216). Processing then proceeds to step 178 to execute the command to the identified bus, as elaborated below in connection with FIG. 5C.

If, in step 202, no further memory cycle entries are located, then the memory command does not match any entries in the routing table. In this condition, processing proceeds to step 218, in which control circuit 32 determines whether to make a subtractive selection of the first routing table entry. In step 218, control circuit 32 determines whether (a.) the subtractive selection enable bit 68 is set and (b.) the first entry in the routing table is enabled. If so, control circuit 32 proceeds to step 220, and selects the first entry in the routing table, and then proceeds to step 212 to translate the command, prepare to queue the command for execution, and retrieve prefetch or combine parameters. Alternatively, if subtractive selection is not to be performed due to failure of either condition (a.) or (b.), a master abort is executed (step 182), ignoring the command, and processing is done (step 180).

Commands directed to the routing table via the BAR0 address (step 162) are handled separately from other commands. These commands are evaluated (step 222) to determine whether the routing table entry that is sought to be written by the command is currently enabled, i.e., if the corresponding enable bit 72 or 74 is set to a "1" value. If the command is an attempt to overwrite an enabled routing table entry, then the command is ignored by executing a target abort (step 226), and processing is done (step 180). If, however, the command is not attempting to overwrite an enabled routing table entry, then access is permitted in a non-burst mode (step 224), to permit a write to the routing table entry identified in the command.

Figure 5C:
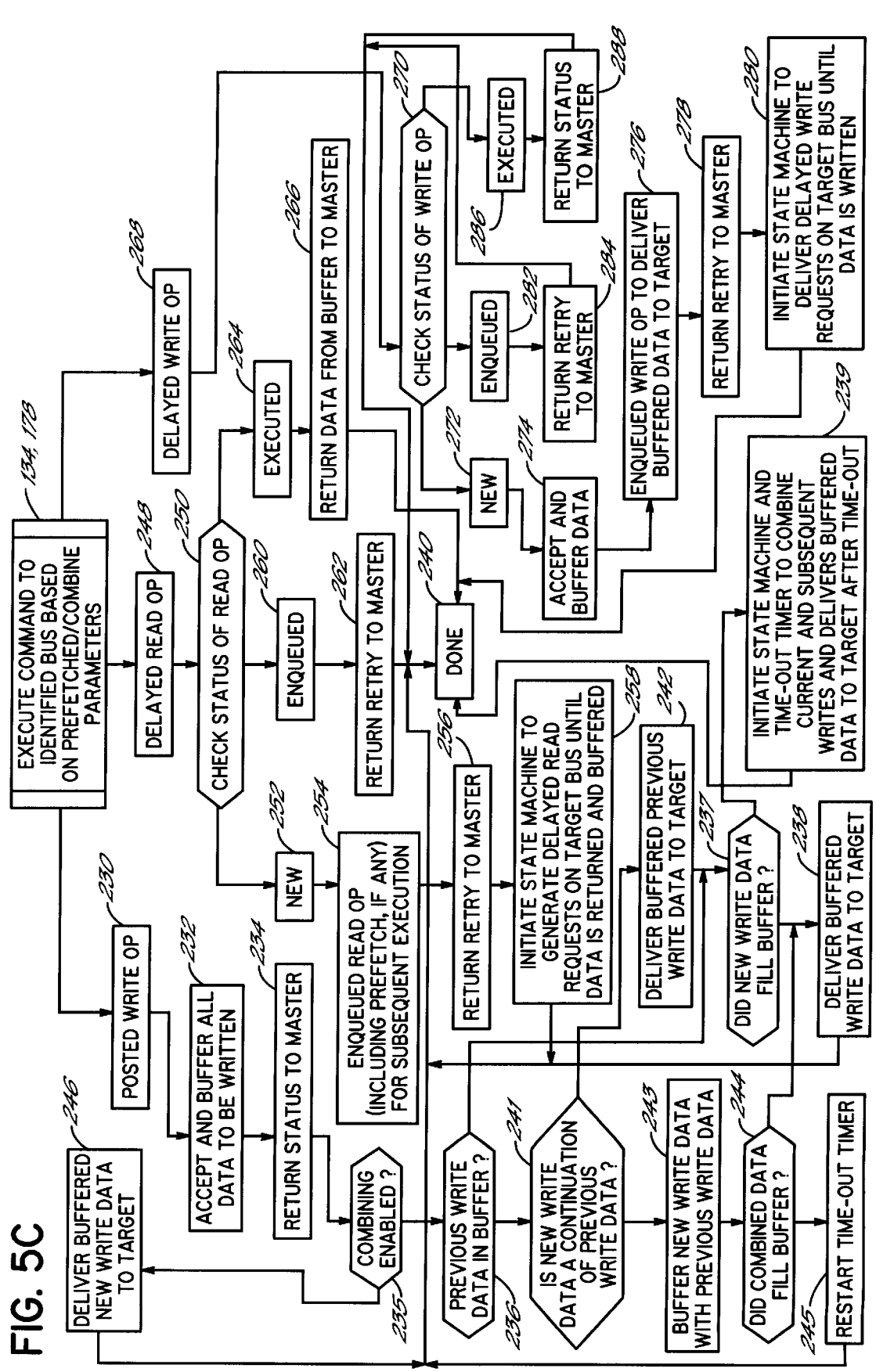
FIG. 5C is a flow chart illustrating the operations performed by the routing circuit in executing a command.

Referring now to FIG. 5C, an explanation can be made of operations of control circuit 32 in executing a command to an identified bus based on prefetch and combine parameters. When the operations of FIG. 5C are initiated (steps 134, 178), control circuit 32 has already determined the target bus for a command to be forwarded by routing circuit 24, and determine the prefetching and combine parameters to be used. Accordingly, if the command is a posted write operation (step 230), control circuit 32 first causes the data buffer and N-way switch circuit 34 to accept and buffer all data to be written in response to the command (step 232). Next, a status word is returned to the master device (step 234), completing the write task from the master device's perspective.

Subsequently, if combining is enabled (step 235), appropriate actions are taken based on whether there is data from a previous write in the buffer. If there is no data from previous writes in the buffer (step 236), then control circuit 32 determines whether the new data buffered in step 232 filled the buffer to the combining limit (step 237). If so, then the buffered write data is delivered immediately to the target (step 238), e.g., by invoking a state machine in control circuit 32 to deliver a write command to the target when the bus is available. If not, then control circuit 32 invokes a state machine to combine the data with data from any subsequent adjacent write commands which may be received, and then deliver the data once the buffer has been filled (to the size identified in the combine parameters), or a time-out occurs (step 239). After these steps, processing is done (step 240).

If in step 236, there is data from previous writes in the buffer, then control circuit 32 determines whether the new data is a continuation of the previous write data (step 241). The new data will be considered a continuation of the previous data if the new data starts where the previous data left off or after a short gap of, e.g., four bytes or less. If the new data is not a continuation of the previous data, then the buffered previous write data is immediately delivered to the target (step 242), e.g., by invoking a state machine in control circuit 32 to deliver a write command to the target when the bus is available, and then control circuit 32 proceeds to step 237 to determine whether the new write data has filled the buffer, and if not, to initiate a state machine and timeout timer.

If in step 241, the new data is found to be a continuation of the previous write data, then the new data is combined with the previously written data (step 243). Next, control circuit 32 determines whether the combined data has filled the buffer (step 244). If so, the buffered data is delivered to the target (step 238), e.g., by invoking a state machine in control circuit 32 to deliver a write command to the target when the bus is available. If the buffer is not full, then the time-out timer of the state machine managing combining of data is restarted (step 245).

If combining is not enabled, then the buffered new write data is always delivered to the target (step 246), e.g., by invoking a state machine in control circuit 32 to deliver a write command to the target when the bus is available, and processing is done (step 240).

Delayed operations are handled differently. Delayed read operations (step 248) are handled by state machines in control circuit 32. The status of a read operation (step 250) determines the action taken. When the delayed read command is first received by routing circuit 24, it is a new command (step 252). In this case, the read operation is queued for subsequent execution along with any appropriate prefetching (step 254). A retry is returned to the master to confirm that the read operation has not yet been completed (step 256). Then, a state machine is initiated, to generate delayed read requests on the target bus until the requested data is returned and buffered by data buffer and N-way switch circuit 34 (step 258). Once these steps have occurred, the next time the master delivers the delayed read command to routing circuit 24, if the data has not yet been returned from the target bus, control circuit 32 will recognize the read operation as an queued operation (step 260) from the state of the state machine initiated in step 258, and return a retry to the master (step 262). However, once the data has returned from the target bus, the next time the master delivers the delayed read command to routing circuit 24, control circuit 32 will recognize the delayed read operation as an executed operation (step 264), and will return the data to the master (step 266), after which, the state machine initiated in step 258 has completed its operations and is free to perform new operations.

Delayed write operations (step 268) are also handled by state machines in control circuit 32. The status of a write operation (step 270) determines the action taken. When the delayed write command is first received by routing circuit 24, it is a new command (step 272). In this case, control circuit 32 accepts and buffers the data (step 274), and the write operation is queued for subsequent execution (step 276). A retry is returned to the master to confirm that the write operation has not yet been completed (step 278). Then, a state machine is initiated, to generate delayed write requests on the target bus until the data is written from the buffer in data buffer and Nway switch circuit 34 (step 280). Once these steps have occurred, the next time the master delivers the delayed write command to routing circuit 24, if the data has not yet been delivered to the target bus, control circuit 32 will recognize the write operation as an queued operation (step 282) from the state of the state machine initiated in step 280, and return a retry to the master (step 284). However, once the data has been delivered to the target bus, the next time the master delivers the delayed write command to routing circuit 24, control circuit 32 will recognize the delayed write operation as an executed operation (step 286), and will return a status word to the master indicating successful completion (step 288), after which, the state machine initiated in step 280 has completed its operations and is free to perform new operations.

Various modifications may be made to the exemplary embodiments without departing from the spirit and scope of the invention. Therefore, the invention is defined in the claims hereinafter appended.

What is claimed is:

1. A routing circuit for interconnecting a primary computer expansion bus and first and second secondary computer expansion busses for forwarding commands between the primary and secondary computer expansion busses, each command having an address, comprising
 a multi-way switch interconnecting the primary bus and first and second secondary busses,
 a memory storing entries mapping each bus to at least one address range, and
 a control circuit, the control circuit controlling the multi-way switch to forward commands between the primary and secondary busses in response to the address of the command and entries stored in the memory, the control circuit:
  controlling the multi-way switch to forward a command received from the primary bus having an address within an address range mapped to a secondary bus, to that secondary bus,
  controlling the multi-way switch to forward a command received from a secondary bus having an address within an address range mapped to the primary bus, to the primary bus, and
  controlling the multi-way switch to forward a command received from the first secondary bus having an address within an address range mapped to the second secondary bus, to the second secondary bus, without use of the primary bus;
 whereby traffic and latency on the primary bus due to commands sent from one secondary bus to another, is reduced.

2. The routing circuit of claim 1 wherein the memory comprises
 control registers specifying address ranges for commands received on the primary bus which map to the first and second secondary busses, the control circuit forwarding a command received from the primary bus having an address within an address range mapped by a control register to a secondary bus, to that secondary bus, and
 a routing table of entries, each entry specifying an address range for commands received on a secondary bus which map to another bus, the control circuit forwarding a command received from a secondary bus having an address within an address range mapped by a routing table entry to another bus, to that other bus.

3. The routing circuit of claim 2 further comprising additional secondary busses, each connected to the multi-way switch in the routing circuit.

4. The routing circuit of claim 2 wherein in the routing table includes a plurality of entries for a secondary bus, each entry specifying an address range and mapping to a bus to which commands with addresses in the range should be forwarded.

5. The routing circuit of claim 4 wherein the memory further comprises enable registers, the enable registers identifying which of the routing table entries are enabled, and
 the control circuit responds to a command received from a secondary bus by comparing an address of the command to any enabled entries for the secondary bus, and when the address of the command is determined to be within an address range of a matching entry, the command is forwarded to the bus mapped by the address range of the matching entry.

6. The routing circuit of claim 5 wherein, if there are no enabled routing table entries for a secondary bus, the control circuit routes commands from the secondary bus to the primary bus only if the address of the command is not in the range mapped by a control register to the secondary bus.

7. The routing circuit of claim 4 wherein the routing table includes at least two entries for a secondary bus, each entry mapping an address range to an other bus, and
 the control circuit responds to a command received from a secondary bus by comparing an address of the command to each of the entries for the secondary bus, and when the address of the command is determined to be within an address range of a matching entry, the command is forwarded to the bus mapped by the address range of the matching entry.

8. The routing circuit of claim 4 wherein commands received from the primary or secondary bus include input/output commands and memory access commands, and the routing table includes at least two entries for input/output commands for a secondary bus, and at least two entries for memory access commands for a secondary bus, each entry mapping an address range to an other bus, and
 the control circuit responds to an input/output command received from the secondary bus by comparing an address of the command to each of the entries for input/output commands for the secondary bus, and when the address of the command is determined to be within an address range of a matching entry, the command is forwarded to the bus mapped by the address range of the matching entry, and
 the control circuit responds to a memory access command received from the secondary bus by comparing an address of the command to each of the entries for memory access commands for the secondary bus, and when the address of the command is determined to be within an address range of a matching entry, the command is forwarded to the bus mapped by the address range of the matching entry.

9. The routing circuit of claim 2 wherein the routing table entries further specify an address offset to be applied to forwarded commands, and
 the control circuit, upon matching a command from a secondary bus having an address within an address range mapped in a routing table entry to another bus, modifies the address of the command in accordance with the address offset in the routing table entry, and then forwards the modified command to that other bus.

10. The routing circuit of claim 2 wherein the routing table entries further specify pre-fetching activities to be performed when forwarding read commands which read memory locations, and
 the control circuit, upon matching a read command from a secondary bus to an address range mapped in a matching routing table entry to an other bus, generates commands to that other bus which read additional memory locations not initially requested by the read command, based upon pre-fetching activities specified in the matching routing table entry.

11. The routing circuit of claim 10 wherein the multi-way switch further comprises a data buffer for buffering the contents of additional memory locations read as part of pre-fetching activities specified in a routing table entry.

12. The routing circuit of claim 2 wherein the routing table entries further specify write block sizes to be used when forwarding write commands which write data into addressed memory locations, and
 the control circuit, upon matching a write command from a secondary bus to an address range mapped in a routing table entry to an other bus, combines the data for the write command with data obtained from other write commands, and writes the combined data over the other bus.

13. The routing circuit of claim 12 wherein the multi-way switch further comprises a data buffer for buffering data for multiple write commands being combined.

14. A method for forwarding commands between a primary computer expansion bus and first and second secondary computer expansion busses, each command having an address, comprising mapping each bus to at least one address range, and forwarding a command received from the primary bus having an address within an address range mapped to a secondary bus, to that secondary bus, forwarding a command received from a secondary bus having an address within an address range mapped to the primary bus, to the primary bus, and forwarding a command received from the first secondary bus having an address within an address range mapped to the second secondary bus, to the second secondary bus, without use of the primary bus;

whereby traffic and latency on the primary bus due to commands sent from one secondary bus to another, is reduced.

15. The method of claim 14 further comprising mapping address ranges for commands received on the primary bus to the first and second secondary busses, and forwarding a command received from the primary bus having an address within an address range mapped to a secondary bus, to that secondary bus, and mapping, for a secondary bus, an address range for commands received on the secondary bus to an other bus, and forwarding a command received from a secondary bus having an address within an address range mapped to an other bus, to that other bus.

16. The method of claim 15 further comprising mapping a plurality of address ranges for a secondary bus, each address range being mapped to an other bus, commands from the secondary bus with addresses in a range, being forwarded to an other bus mapped by the range.

17. The method of claim 16 further comprising responding to a command received from a secondary bus by comparing an address of the command to each of the address ranges for the secondary bus, and when the address of the command is determined to be within a matching address range, forwarding the command to an other bus mapped by the matching range.

18. The method of claim 17 further comprising, if there are no address ranges for a secondary bus, routing commands from the secondary bus to the primary bus only if the address of the command is not in the range mapped to the secondary bus for commands received from the primary bus.

19. The method of claim 16 wherein at least two address ranges for a secondary bus are mapped to other busses, further comprising comparing an address of a command from the secondary bus to each of the address ranges for the secondary bus, and when the address of the command is determined to be within an address range mapped to an other bus, forwarding the command to the bus mapped by the address range.

20. The method of claim 16 wherein commands received from the primary or secondary bus include input/output commands and memory access commands, and wherein at least two address ranges for input/output commands received from a secondary bus, are mapped to other busses, and at least two address ranges for memory access commands from the secondary bus, are mapped to other busses, further comprising responding to an input/output command received from the secondary bus by comparing an address of the command to each of the address ranges for input/output commands for the secondary bus, and when the address of the command is determined to be within an address range of a matching entry, forwarding the command to the bus mapped by the address range of the matching entry, and responding to a memory access command received from the secondary bus by comparing an address of the command to each of the address ranges for memory access commands for the secondary bus, and when the address of the command is determined to be within an address range of a matching entry, forwarding the command to the bus mapped by the address range of the matching entry.

21. The method of claim 14 wherein an address offset is applied to at least some commands which are forwarded.

22. The method of claim 14 wherein as part of forwarding a read command which reads memory locations, commands are generated to pre-fetch additional memory locations not initially requested by the read command.

23. The method of claim 22 further comprising buffering the contents of additional memory locations that are pre-fetched.

24. The method of claim 14 wherein as part of forwarding a write command which writes data into addressed memory locations, the data is combined with data for contiguous memory locations obtained from other write commands, and then the combined data is written contiguously.

25. The method of claim 24 further comprising buffering data for multiple write commands being combined.

* * * * *

UNITED STATES PATENT AND TRADEMARK OFFICE
CERTIFICATE OF CORRECTION

PATENT NO. : 6,233,641 B1
DATED : May 15, 2001
INVENTOR(S) : Charles Scott Graham; Shawn Michael Lambeth; Daniel Frank Moertl; Paul Edward Movall It is certified that error appears in the above-identified patent and that said Letters Patent is hereby corrected as shown below:

Title page,
The title should read in full as follows:

-- APPARATUS AND METHOD OF PCI ROUTING IN A BRIDGED CONFIGURATION PERMITTING INDEPENDENT USE OF BUSSES --

Column 20, claim 1,
Line 42, delete "the".

Signed and Sealed this

Twenty-seventh Day of November, 2001

Attest:

NICHOLAS P. GODICI
*Attesting Officer*    *Acting Director of the United States Patent and Trademark Office*